(12) United States Patent
Boesen

(10) Patent No.: US 6,718,043 B1
(45) Date of Patent: Apr. 6, 2004

(54) VOICE SOUND TRANSMITTING APPARATUS AND SYSTEM INCLUDING EXPANSION PORT

(76) Inventor: Peter V. Boesen, 4026 Beaver Ave., Des Moines, IA (US) 50310

( * ) Notice: Subject to any disclaimer, the term of this patent is extended or adjusted under 35 U.S.C. 154(b) by 284 days.

(21) Appl. No.: 09/619,233

(22) Filed: Jul. 19, 2000

Related U.S. Application Data

(63) Continuation-in-part of application No. 09/309,107, filed on May 10, 1999, now Pat. No. 6,094,492.

(51) Int. Cl.$^7$ ................................................ H04R 25/00
(52) U.S. Cl. .................... 381/314; 381/322; 381/323; 381/326; 381/328
(58) Field of Search ................. 381/313, 314, 381/315, 322, 323, 324, 326, 328

(56) References Cited

U.S. PATENT DOCUMENTS

| | | | |
|---|---|---|---|
| 4,334,315 A | | 6/1982 | Ono et al. |
| 4,588,867 A | | 5/1986 | Konomi |
| 4,654,883 A | | 3/1987 | Iwata |
| 4,791,933 A | | 12/1988 | Asai et al. |
| 4,989,251 A | * | 1/1991 | Mangold |
| 5,191,602 A | | 3/1993 | Regen et al. |
| 5,298,692 A | | 3/1994 | Ikeda et al. |
| 5,381,798 A | | 1/1995 | Burrows |
| 5,422,934 A | | 6/1995 | Massa |
| 5,613,222 A | | 3/1997 | Guenther |
| 5,692,059 A | * | 11/1997 | Kruger |
| 5,721,783 A | * | 2/1998 | Anderson |
| 5,771,438 A | | 6/1998 | Palermo et al. |
| 5,786,106 A | | 7/1998 | Armani |
| 5,930,729 A | | 7/1999 | Khamis et al. |
| 5,987,146 A | | 11/1999 | Pluvinage et al. |
| 6,021,207 A | * | 2/2000 | Puthuff |
| 6,035,050 A | * | 3/2000 | Weinfurtner |
| 6,073,031 A | | 6/2000 | Helstab et al. ............... 455/557 |
| 6,081,724 A | | 6/2000 | Wilson ........................ 455/462 |
| 6,112,103 A | | 8/2000 | Puthuff |
| 6,144,748 A | * | 11/2000 | Kerns |
| 6,181,801 B1 | | 1/2001 | Puthuff et al. |

FOREIGN PATENT DOCUMENTS

| | | |
|---|---|---|
| EP | 0 683 621 A | 11/1995 |
| GB | 2 074 817 A | 11/1981 |

OTHER PUBLICATIONS

Air Magic Wireless Headset User Guide.
Article entitled "A One–Size Disposable Hearing Aid Is Introduced," by Wayne J. Staab, Walter Sjursen, David Preves & Tom Squeglia, pp. 36–41, The Hearing Journal, Apr. 2000, vol. 53, No. 4.
Article entitled "Brain cancer victim sues cell–phone providers," http://www.cnn.com/2000/TECH/computing/08/08/cellular.cancer.lawsuit.idg/index.html.

(List continued on next page.)

Primary Examiner—Curtis Kuntz
Assistant Examiner—Dionne Harvey
(74) Attorney, Agent, or Firm—McKee, Voorhees & Sease, P.L.C.

(57) ABSTRACT

A voice sound transmitting and receiving unit having an earpiece that is adapted for insertion into the external auditory canal of a user, the earpiece having an expansion module. The voice sound transmitting unit includes a sensor, which may be a bone conduction sensor or an air conduction sensor, or both. Prior to transmission, additional processing, modification, or formatting of sensor output maybe done by the expansion module. Alternatively, all local processing, modification, or formatting of sensor output may be done via the expansion module. The transmission of the voice sound signal may be through a wireless linkage.

16 Claims, 3 Drawing Sheets

OTHER PUBLICATIONS

Article entitled "Report Urges Curbs on Mobile Phone Use," May 15, 2000, http://www.techweb.com/wire/story/TWB20000515S005.

Article entitled "Scientist link eye cancer to mobile phones," by Jonathan Leake, Jan. 14, 2001, http://www.Sunday-times.co.uk/news/pages/sti/2001/01/14/stinwenws01032.html.

Article entitled "The Hearing Review," Jan. 1999, vol. 3: Hearing in Noise (Supplement) pp. 1–62.

Article entitled "The latest on cell phone emissions".

Article entitled "U.S. Will Oversee Cell–Phone Safety Studies," Jun. 9, 2000, http://www.techweb.com/wire/story/reutrers/REU20000609S0003.

Article entitled "What is a Wireless LAN?" 1998, Proxim, Inc.

Article entitled "Wireless Future Sizzles," Keith Darce, The Times–Picayne, Sep. 26, 1999.

Article entitled "Wireless Worries: Are Cell Phones a Danger to You and Your Children," May 26, 2000, http://more.abcnews.go.com/onair/2020/2020_000526_cellphones.html.

Bluetooth Usage Model, http://www.bluetooth.com/bluetoothgueide/models/ultimate.asp (visited Jun. 26, 2000).

Article entitled, "Tiny computers come in handy, doctors find," by Thomas R. O'Connell, Des Moines Register, pp. 1B, 4B, Des Moines, Iowa.

* cited by examiner

VOICE SOUND TRANSMITTING APPARATUS AND SYSTEM INCLUDING EXPANSION PORT

CROSS-REFERENCE TO A RELATED APPLICATION

Continuation-in-Part of U.S. patent application Ser. No. 09/309,107 filed May 10, 1999 now U.S. Pat. No. 6,094,492 entitled BONE CONDUCTION VOICE TRANSMISSION APPARATUS AND SYSTEM.

BACKGROUND OF THE INVENTION

1. Field of the Invention

The present invention relates to a voice sound transmitting and receiving apparatus and system. More particularly, though not exclusively, the present invention relates to a voice sound transmitting unit which is adaptable through the use of an expansion port.

2. Problems in the Art

Voice sound transmitting and receiving devices are known in the art. However, such devices are limited by the quality of voice signal they are capable of capturing and transmitting. For example, prior art microphones tend to pick up ambient noise and transmit the same. This is particularly problematic in communications applications that require a pure, unadulterated voice signal. For communication systems to more effectively utilize voice sound as a means of transmitting information, the prior art voice sound transmitting and receiving devices must be capable of producing a much purer voice sound signal. One specific communications application area that relies upon a clear voice signal is voice recognition technology.

Today, voice recognition software engines are gaining popularity. Such computer software enables the user to, among other things, enter information into a digital record or file directly through speech, obviating the need for keyboard or other input device. Voice recognition offers numerous advantages when employed as a means of data entry in computer information systems. As but one example, many health care professionals presently dictate patient information onto magnetic tapes that are later transcribed by a third-party for entry into a medical record system. A system that could utilize existing voice recognition technology to enter such information into digital records would save enormous amounts of time and money. The same holds true for the plethora of other applications that are not presently using voice as a means of data input and communication.

A problem that must be overcome to effectively implement an information or communication system using voice sound is the relative poor quality of voice signal obtained through prior art voice sound transmitting and receiving devices. The efficacy of voice recognition software engines depends upon the quality of the voice signal received. Bone conduction sensors deliver a fairly pure signal. Air conduction sensors, on the other hand, will receive a much stronger signal. Depending upon which sensor is used, different processors may be required. Further, as sensor technology continues to improve, processing technology will need to adapt. Also, as voice recognition software is becoming widely used in various applications, it is becoming more and more desirable to provide for an adaptable voice sound transmitting unit which can be easily reprogrammed to communicate with many applications. It is therefore easily seen that it is desirable to have a voice sound transmitting unit which is capable of adaptability.

There are also problems in the art concerning the comfort and aesthetic appeal of the voice sound transmitting and receiving devices. For example, prior voice sound transmitting devices, such as those disclosed in U.S. Pat. Nos. 5,295,193 and 4,150,262 to Ono are designed with ear pieces that totally obstruct the external auditory canal. Not only are such devices uncomfortable for the user to wear, but they also block air vibrations from entering the auditory canal. In the health care example cited previously, such a device would preclude the user from using a stethoscope while wearing the device. Further, such devices are less aesthetically pleasing to the user. There is therefore a need in the art for an improved voice sound transmitting unit that does not occlude the external auditory canal, is comfortable to wear for extended periods of time, and is aesthetically pleasing to the user.

FEATURES OF THE INVENTION

A general feature of the present invention is the provision of an improved voice sound transmitting and receiving unit which overcomes the problems found in the prior art.

A further feature of the present invention is the provision of an improved voice sound transmitting and receiving unit which is adaptable.

A further feature of the present invention is the provision of an improved voice sound transmitting and receiving unit that includes an expansion port.

Another feature of the present invention is the provision of an improved voice sound transmitting and receiving unit that is capable of accepting reprogramming.

A still further feature of the present invention is the provision of an improved voice sound transmitting and receiving unit that utilizes a sensor to transmit an unadulterated voice from the user.

Another feature of the present invention is the provision of an improved voice sound transmitting and receiving unit that is capable for use in wireless communications applications.

A further feature of the present invention is the provision of an improved voice sound transmitting and receiving unit that is comfortable to wear and does not occlude or obstruct the external auditory canal of the user.

A further feature of the present invention is the provision of a voice sound transmitting and receiving unit that permits hands-free communication over a wired or wireless communications linkage.

A further feature of the present invention is the provision of a voice sound transmitting and receiving unit that is aesthetically pleasing to the user.

These, as well as other features and advantages of the present invention, will become apparent from the following specification and claims.

SUMMARY OF THE INVENTION

The voice sound transmitting unit of the present invention includes an earpiece that is adapted for insertion into the external auditory canal of the user, the earpiece having a sensor adapted to convert vibrations of voice sound information into electrical signals. The voice sound transmitting unit also includes a speech processor and transmitter. Further, the voice sound transmitting unit includes adaptable hardware capable of either replacement or reprogramming.

In a preferred form, the sensor of the present invention includes a bone conduction sensor adapted to convert bone vibrations of voice sound information into electrical signals and an air conduction sensor residing within the auditory canal of the user and converting air vibrations of voice sound information and electrical signals. It is to be understood that either the bone conduction sensor or the air conduction sensor may be used individually, however, it is felt the use of both sensors provides the purest voice sound signal. The speech processor samples the output from the bone conduction sensor and the air conduction sensor. In comparing the sampled output, the speech processor is able to filter noise and select a pure voice sound signal for transmission.

Prior to transmission, it may be desirable to further process, modify, reformat, or otherwise alter the voice sound signal from the speech processor. Accordingly, an expansion port is operatively connected to the speech processor and the transmitter. The expansion port is capable of receiving an expansion module. The expansion module is preferably removable. The expansion port may consist of a socket, such as a pin socket, chip socket or zero insertion force socket. The expansion module may include a digital signal processing (DSP) chip, a micro controller, a field programmable gate array (FPGA), a programmable logic device (PLD), a random access or random operating memory (RAM or ROM) chip, a subscriber identity module (SIM) card, such as the 16K SIM card manufactured by Schlumberg Electronic Transactions containing 16 k of reprogrammable memory, an integrated circuit or any combination thereof or a battery for additional power supply. These various types of modules may be connected either through a socket, such as those previously mentioned, or through a carrier board edge connect.

The transmission of the voice sound signal may be through a wireless linkage. In addition, the bone conduction sensor and the air conduction sensor are preferably designed so as not to occlude the external auditory canal. The voice sound transmitting unit may also be equipped with a speaker and receiver to enable two-way communication. Of course the transmitter and receiver may be combined into one transceiver so as to minimize necessary space.

Though it is apparent that the present invention has a multitude of applications, in its preferred form the present invention also includes a device for entering voice sound information into a digital records stored on a computer or computer network. The use of the expansion port in corresponding expansion modules allows the present invention to be easily adaptable to any desired type of computer hardware. Further, as voice activation and voice recognition computer codes are continually enhanced, the expansion port allows for easy upgradability of internal programming or for additional power supply. Further, as processing methods are enhanced and improved, the expansion port will allow for additional processing and/or processing refinements to be easily incorporated.

The device of the present invention includes a voice sound transmitting unit, an interface between the voice sound transmitting unit and the computer or computer network, and a voice recognition software engine adapted to receive and process the voice sound information and convert it into alpha numeric strains to populate the appropriate digital record. The interface is preferably a wireless linkage, such as a radio frequency or infrared transmission system. It is to be understood that this interface is capable of not only providing voice sound information to a computer or computer network, but may also be used to provide voice sound information to a multitude of various hardware applications, including cellular telephones, personal digital assistants, and any other hardware application in which voice sound information may be desirable. It should be understood that the present invention has wide-ranging applications, not specifically limited to the examples disclosed in this specification.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives which may be included within the spirit and scope of the invention.

Figure 1:
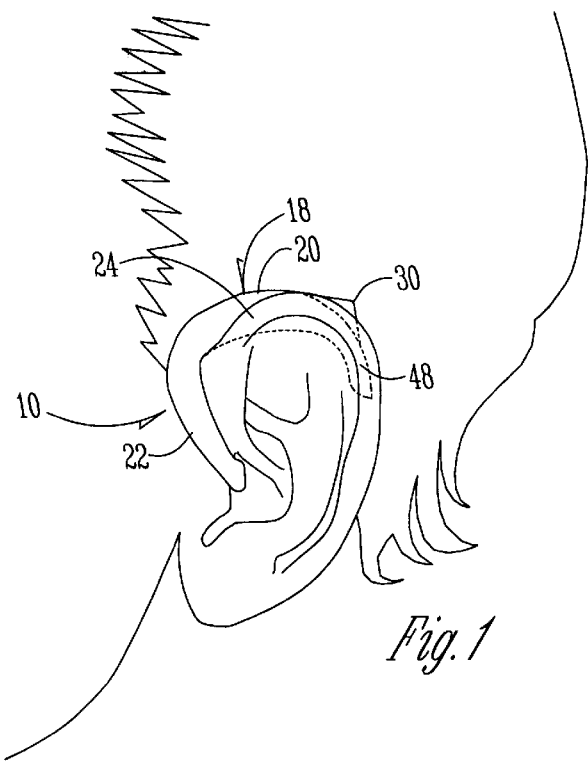
FIG. 1 is a perspective view of the voice sound transmitting unit of the present invention.
Figure 2:
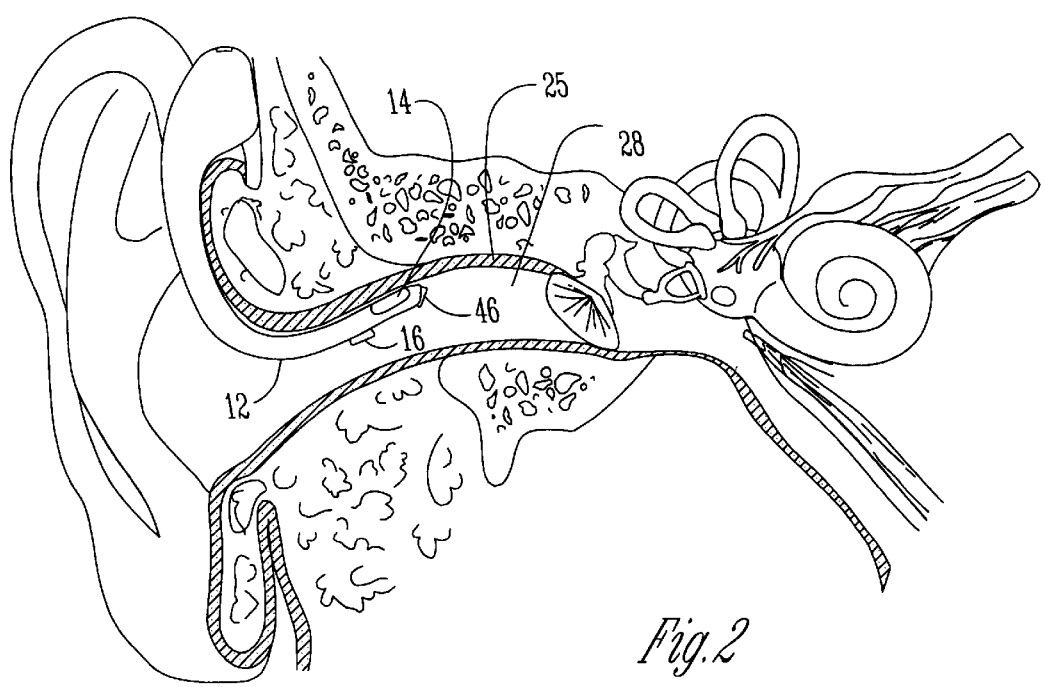
FIG. 2 is a cross-sectional view of the voice sound transmitting unit of FIG. 1 taken through the external auditory canal of the user.

Now, referring to the drawings, FIGS. 1 and 2 show the voice sound transmitting unit 10 of the present invention. The voice sound transmitting unit 10 includes an earpiece 12 having a bone conduction sensor 14, an air conduction sensor or microphone 16, a speaker 46, an expansion port 26, and an expansion module 30. A casing 18 is also provided, having an ear attachment portion 20 and a fitting portion 22 that connects the ear attachment portion 20 with the bone conduction sensor 14 and the air conduction sensor 16.

The ear attachment portion 20 is contoured to fit over and behind the upper ear lobe 24 of the user and is preferably made of a lightweight aluminum or plastic material. It can be appreciated that the primary purpose of the ear attachment portion 20 is to secure the voice sound transmitting unit 10 in proper position. The fitting portion 22 is integral with the ear attachment portion 20 and is reinforced with a flexible wire (not shown) so that the voice sound transmitting unit 10 may be adapted to fit the user and maintain the bone conduction sensor 14 and the air conduction sensor 16 in their proper positions within the external auditory canal 28 of the user.

As best shown in FIG. 2, the voice sound transmitting unit should be fit so that the bone conduction sensor 14 is in operative contact with a portion of the external auditory canal 28. It is preferred that the bone conduction sensor 14 rest directly against the posterior superior wall of the external auditory canal 28, with the fitting portion 22 shaped to bias the bone conduction sensor 14 into position. Fitting the device and calibrations may be performed by the user or with the assistance of a physician or an audiologist/audiology technician.

The bone conduction sensor 14 is of standard construction and may be obtained from various hearing aid manufacturers, including Endevco and others. Note that the bone conduction sensor 14 may be of the acceleration type and utilize a piezoelectric pick-up. Other pick-ups that can be used with the present invention, include, but are not limited to, those of the magnetic type, electet condenser type, IC type, and semi-conductor type. All are well-known in the art.

The earpiece 12 is formed so that the bone conduction sensor 14 may be inserted into the external auditory canal 28 of the user and contact against the posterior superior wall 25 of the canal. The bone conduction sensor 14 is intended to pick up, as the voice signals, the vibrations of the upper wall of the external auditory canal 28 at the time of uttering the voice sounds. When the user utters voice sounds, these sounds reach the mastoid bones. These sound vibrations in the external auditory canal portion in contact with the bone sensor 14 are then processed.

In addition to the bone conduction sensor 14, the earpiece 12 also includes an air conduction sensor or microphone 16. Like the bone conduction sensor 14, the air conduction sensor 16 is of standard construction and may be obtained from various manufacturers, such as ReSound and Oticon with numerous air microphones which would suffice. The bone conduction sensor 14 and the air conduction sensor 16 are both tuned to receive frequencies within the range of audible human speech, approximately 50 to 8000 Hertz.

A resilient member (not shown) is preferably positioned between the air conduction sensor 16 and the bone conduction sensor 14 in such a manner that the external sound collected by the air conduction sensor 16 will not be transmitted to the bone conduction sensor 14.

A circuit portion (not shown) transmits the electrical signals from both the bone conduction sensor 14 and the air conduction sensor 16 to a speech processor 36. (See FIG. 5) A power source, such as a LiH battery is operatively connected to the circuit portion. The power source (not shown) may be rechargeable. The speech processor 36 is of a conventional construction used in many hearing aids and employs an anolog or digital processing scheme to package the voice signal for transmission across a wireless linkage. In a preferred embodiment, the speech processor 36 will be programmed to extract similarities from air and bone transmission, comparing the similarities in signal and then transmitting via a wireless linkage to a computer or other receiving device. The speech processor 36 also filters out through band pass filters sounds outside the frequency of normal human speech.

The speech processor 36 samples a portion of the electrical signals of voice sound information from the bone conduction sensor 14 and a portion of the electrical signals of voice sound information from the air conduction sensor 16. The speech processor 36 then compares the samples and selects the common voice signal. This common voice signal increases the likelihood that ambient and environmental interference will be minimized.

The speech processor 36 then transmits the selected voice signal to a transmitter 42. The transmitter 42 is preferably a wireless radio frequency transmitter well known in the art that includes a multi-directional antenna 48 (see FIG. 1). Examples are Proxim Corporation's RangeLan 2 or Breezecom radio transmission systems.

Figure 3:
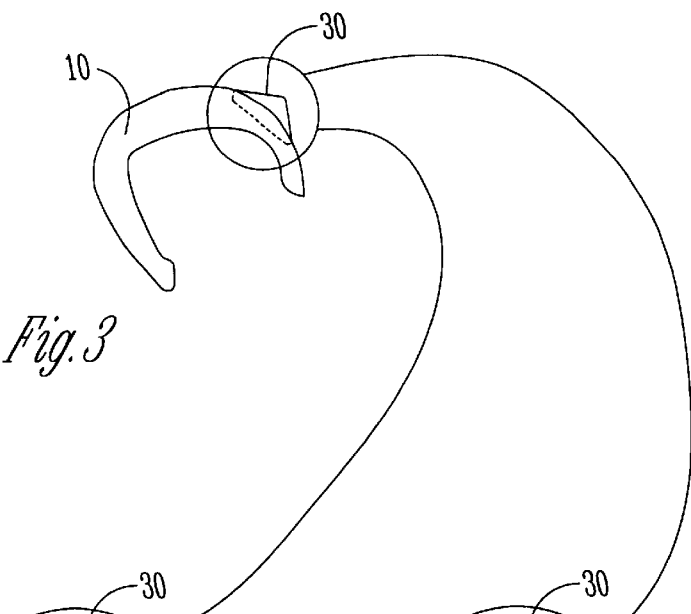
FIG. 3 is a side view of the voice sound transmitting unit of the present invention highlighting the expansion port with the expansion module installed.
Figures 3A, 3B:
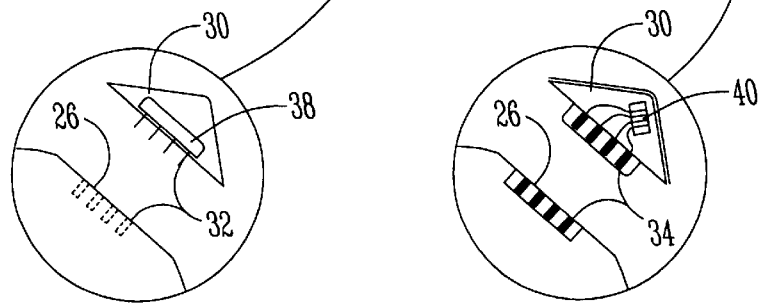
FIGS. 3A and 3B are two alternative embodiments of the expansion port with the expansion module removed.

FIG. 3 shows the voice sound transmitting unit 10, including the installed expansion module 30. As is shown in FIGS. 3A and 3B, the expansion module 30 is easily removed from the expansion port 26. The expansion port modules of FIG. 3A are operatively connected via a pin connect 32. As shown, the pin connection 32 operatively connects a DSP chip 38 into the expansion port 26. As shown in FIG. 3B, an integrated circuit 40 is operatively connected to the expansion port 26 through an edge connect 34. Of course, alternatives to the integrated circuit 40 and DSP chip 38 are available as mentioned previously. Further, any combination of these chips and/or circuitry may be used to achieve a desired result. For example, the DSP chip 38 of FIG. 3A may contain code necessary to further process the voice sound information prior to transmission. Further, the DSP chip may be reprogrammable via coded instructions via the transmitted receiver 44. Alternatively, the integrated circuit 40 may contain programming, such as voice recognition software, which will allow voice commands of various hardware and software applications to be recognized. Further, the module may contain a power supply such as a NiMH rechargable battery or any other battery commonly available.

Figures 4A, 4B:
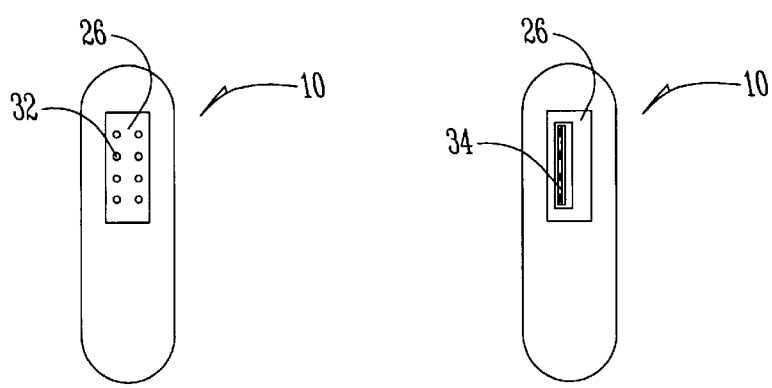
FIGS. 4A and 4B are rear perspective views of two alternative embodiments of the expansion port corresponding to FIGS. 3A and 3B respectively.

FIGS. 4A and 4B correspond to the alternative embodiment shown in FIGS. 3A and 3B. As shown in FIG. 4A, the expansion port 26 includes the receiving portion of the pin connect 32. As shown in FIG. 4B, the expansion port 26 includes an edge connect 34 in which a series of contacts are pressure fit to the corresponding edge connect 34 of an expansion module.

Figure 5:
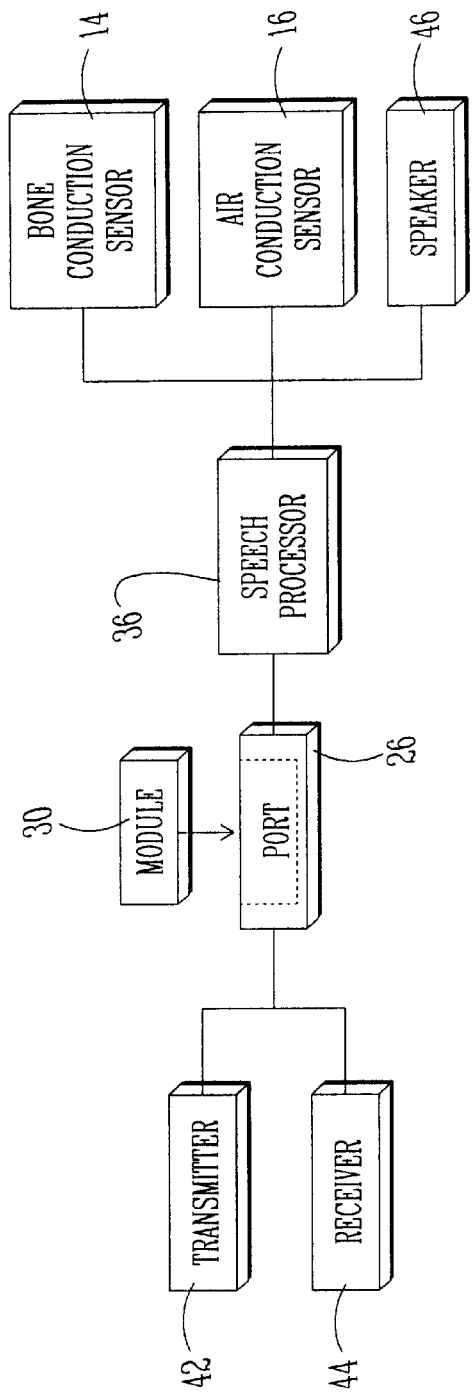
FIG. 5 is a diagram of the main componentry of the voice sound transmitting unit of the present invention.
Figure 6:
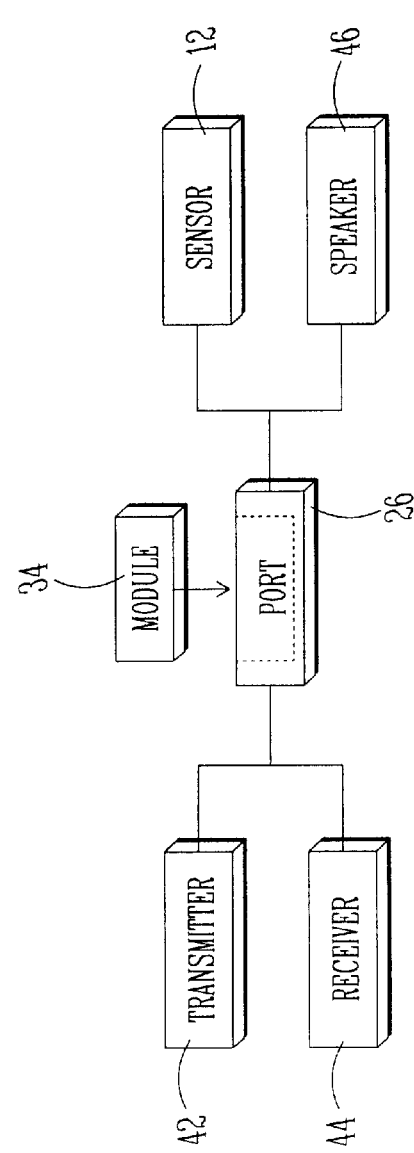
FIG. 6 is a diagram of the main componentry of an alternative embodiment of the voice sound transmitting unit of the present invention.

FIG. 5 shows in block diagram form the different components of the voice sound transmitting unit 10. It should be understood that the voice sound transmitting unit 10 as shown and previously described can be easily modified to include a receiver 44 and a speaker 46 to enable 2-way communication. As shown in FIG. 5, the expansion module 30 and expansion port 26 are operatively connected in series with the speech processor 36. Of course, any type of parallel/serial electrical arrangement may be used. An alternative embodiment is shown in FIG. 6. In FIG. 6, the module 34 operatively connects to the port 26 which is operatively connected to at least one sensor 12. The module 34 samples the electrical signals of voice on information from the sensor 12 to obtain a voice signal which may be transmitted via transmitter 42.

It can be appreciated that the voice sound transmitting unit 10 of the present invention can be used in a multitude of different communications applications with different linkages. Such applications include, but are by no means limited to, transmitting voice sound information over Internet, Intranet, hard wired Local Area Network (LAN), wireless LAN and telecommunications applications. In short, the voice sound transmitting unit 10 may be easily adapted for use in any communication system to transmit voice sound information.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the acclaimed appended hereto.

What is claimed is:

1. A voice sound transmitting unit having the advantage of adaptability, the unit comprising:

an earpiece adapted to be inserted into the external auditory canal of the user and having at least one sensor being adapted to convert vibrations of voice sound information to electrical signals;

a speech processor disposed within the earpiece operatively connected with the at least one sensor, the speech processor being adapted to receive the electrical signals from the at least one sensor and produce a voice sound signal;

an expansion port disposed within the earpiece;

an expansion module insertable into the expansion port of the earpiece such that the expansion module is integral with the earpiece to provide for further processing of the voice sound signal prior to transmission; and a transmitter disposed within the earpiece and operatively connected with the speech processor and adapted to receive the voice sound signal for transmission.

2. The voice sound transmitting unit of claim 1 wherein the sensor is an air conduction sensor adapted to convert air vibrations of the voice sound information in the external auditory canal.

3. The voice sound transmitting unit of claim 1 wherein the sensor is a bone conduction sensor being adapted to contact a portion of the external auditory canal adjacent the mastoid bone to convert bone vibrations of voice sound information.

4. The voice sound transmitting unit of claim 1 wherein the sensor includes a bone conduction sensor and an air conduction sensor.

5. The voice sound transmitting unit of claim 1 wherein the expansion port is an edge connect port.

6. The voice sound transmitting unit of claim 1 wherein the expansion module includes a DSP chip.

7. The voice sound transmitting unit of claim 1 wherein the expansion module includes a memory chip.

8. The voice sound transmitting unit of claim 1 wherein the expansion module includes a SIM card.

9. The voice sound transmitting unit of claim 1 wherein the expansion module includes a power supply.

10. The voice sound transmitting unit of claim 1 wherein the expansion nodule includes a carrier board.

11. The voice sound transmitting unit of claim 1 wherein the earpiece is smaller in size than the interior of the external auditory canal of a user whereby the earpiece does not block the external auditory canal, and wherein the at least one sensor is adapted for placement within the external auditory canal of a user.

12. The voice sound transmitting unit of claim 1 further comprising a speaker and a receiver, the speaker being adapted to reside within the external auditory canal and is operatively connected to the receiver.

13. The voice sound transmitting unit of claim 1 wherein the expansion port is a socket.

14. The voice sound transmitting unit of claim 13 wherein the socket is a pin socket.

15. The voice sound transmitting unit of claim 13 wherein the socket is a chip socket.

16. The voice sound transmitting unit of claim 13 wherein the socket is a zero insertion socket.

* * * * *